(12) United States Patent
Yasui et al.

(10) Patent No.: US 6,354,076 B1
(45) Date of Patent: Mar. 12, 2002

(54) EXHAUST GAS PURIFICATION SYSTEM OF INTERNAL COMBUSTION ENGINE

(75) Inventors: Yuji Yasui; Shusuke Akazaki; Tadashi Satoh; Yoshihisa Iwaki; Masaki Ueno; Takashi Haga; Tetsuo Endo, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/354,090

(22) Filed: Jul. 15, 1999

(30) Foreign Application Priority Data

Jul. 16, 1998 (JP) .......................................... 10-218588

(51) Int. Cl.[7] ................................................ F01N 3/00
(52) U.S. Cl. .............................. 60/274; 60/277; 60/297
(58) Field of Search .......................... 60/277, 297, 288, 60/274; 436/143

(56) References Cited

U.S. PATENT DOCUMENTS

| 5,315,824 A | * | 5/1994 | Takeshima | 60/297 |
| 5,388,405 A | * | 2/1995 | Fujishita et al. | 60/297 |
| 5,467,594 A | * | 11/1995 | Aoki et al. | 60/297 |
| 5,544,482 A | * | 8/1996 | Matsumoto et al. | 60/277 |
| 5,555,724 A | | 9/1996 | Hatcho et al. | 60/297 |
| 5,634,331 A | * | 6/1997 | Aoki et al. | 60/284 |
| 5,675,967 A | * | 10/1997 | Ries-Mueller | 60/277 |
| 5,706,652 A | * | 1/1998 | Sultan | 60/277 |
| 5,713,198 A | * | 2/1998 | Aoki et al. | 60/277 |
| 5,765,369 A | * | 6/1998 | Tanaka et al. | 60/277 |
| 5,798,270 A | * | 8/1998 | Adamczyk, Jr. et al. | 436/143 |
| 5,896,743 A | * | 4/1999 | Griffin | 60/277 |
| 5,941,067 A | * | 8/1999 | Hirota et al. | 60/277 |
| 6,018,943 A | * | 2/2000 | Martin et al. | 60/274 |

FOREIGN PATENT DOCUMENTS

| EP | 0754841 | | 1/1997 | | |
| EP | 0754841 A | * | 1/1997 | | 60/277 |
| JP | 06101452 | | 4/1994 | | 60/282 |
| JP | 8-071427 | | 3/1996 | | |
| JP | 9-324621 | | 12/1997 | | |
| JP | 10-153112 | | 6/1998 | | |

* cited by examiner

*Primary Examiner*—Thomas Denion
*Assistant Examiner*—Thai-Ba Trieu
(74) *Attorney, Agent, or Firm*—Arent Fox Kintner Plotki & Kahn PLLC

(57) ABSTRACT

A system for purifying exhaust gas generated by an internal combustion engine having an adsorbent, installed in an exhaust system of the engine, which adsorbs unburned components of the exhaust gas such as hydrocarbons generated by the engine. The system has a first temperature sensor for detecting a temperature of the adsorbent and timer for measuring a time until the detected temperature becomes greater or equal to a predetermined value, when the measured time is less than a threshold value, it is discriminated that the adsorbent deteriorates. With this, the deterioration of the adsorbent can be discriminated accurately.

20 Claims, 15 Drawing Sheets

EXHAUST GAS PURIFICATION SYSTEM OF INTERNAL COMBUSTION ENGINE

BACKGROUND OF THE INVENTION

1. Field of the Invention

This invention relates to an exhaust gas purification system of an internal combustion engine, more particularly to a system for discriminating the deterioration of an adsorbent which adsorbs unburned components of the exhaust gas generated by the engine to enhance exhaust gas purification.

2. Description of the Related Art

Internal combustion engines are ordinarily provided with a catalyst (a three-way catalytic converter) in the exhaust system which removes HC, NOx and CO components in the exhaust gas generated by the engine. However, when the engine is cold started, for example, and the catalyst is not activated, unburned components of the exhaust gas, in particular, unburned hydrocarbons (HC) are immediately exhausted to the atmosphere.

For that reason, there is proposed an exhaust gas purification system in Japanese Laid-Open Patent Application Hei 9 (1997)-324,621. In the system, the exhaust pipe is branched out at a location downstream of the catalyst and the bypass is provided with an adsorbent made of a zeolite material or some similar materials which adsorbs unburned components when the catalyst is not activated and desorbs the same after the catalyst has been activated to be recirculated to the engine intake system and burned again in the combustion chambers. Also the assignee proposed a similar system in Japanese Laid-Open Patent Applications Hei 10 (1998)-153,112.

Since if the adsorbent deteriorates it will not achieve the expected performance it is preferable to monitor and discriminate whether the adsorbent deteriorates.

SUMMARY OF THE INVENTION

The object of the invention is therefore to provide an exhaust gas purification system of an internal combustion engine having an adsorbent for adsorbing unburned components of the exhaust gas generated by the engine, which monitors and discriminates whether the adsorbent deteriorates.

Moreover, aside from the deterioration, when the adsorbent adsorbs the unburned components there is a limit beyond which, it can adsorb no more. When this limit is exceeded and exhaust gas is supplied to the adsorbent the adsorbed components such as hydrocarbons would, upon desorption, immediately be emitted to the air. In such an instance, the supply of exhaust gas to the adsorbent should accordingly be discontinued as quickly as possible.

A second object of the invention is therefore to provide an exhaust gas purification system of an internal combustion engine having an adsorbent for adsorbing unburned components of the exhaust gas generated by the engine, which can discontinue the supply of exhaust gas to the adsorbent when the adsorbent has adsorbed the unburned components up to its limit.

This invention achieves this object by providing a system for purifying exhaust gas generated by an internal combustion engine having an adsorbent, installed in an exhaust system of the engine, which adsorbs unburned components of the exhaust gas generated by the engine when the engine has started, comprising: a first temperature sensor for detecting at least one of a temperature of the adsorbent and a temperature at a location downstream of the adsorbent; time measuring means for measuring a time until the detected temperature becomes greater or equal to a predetermined value; and adsorbent deterioration discriminating means for discriminating whether the adsorbent deteriorates based on at least the measured time.

BRIEF EXPLANATION OF THE DRAWINGS

These and other objects and advantages of the invention will be more apparent from the following description and drawings, in which.

PREFERRED EMBODIMENTS OF THE INVENTION

Embodiments of the invention will now be explained with reference to the drawings.

Figure 1:
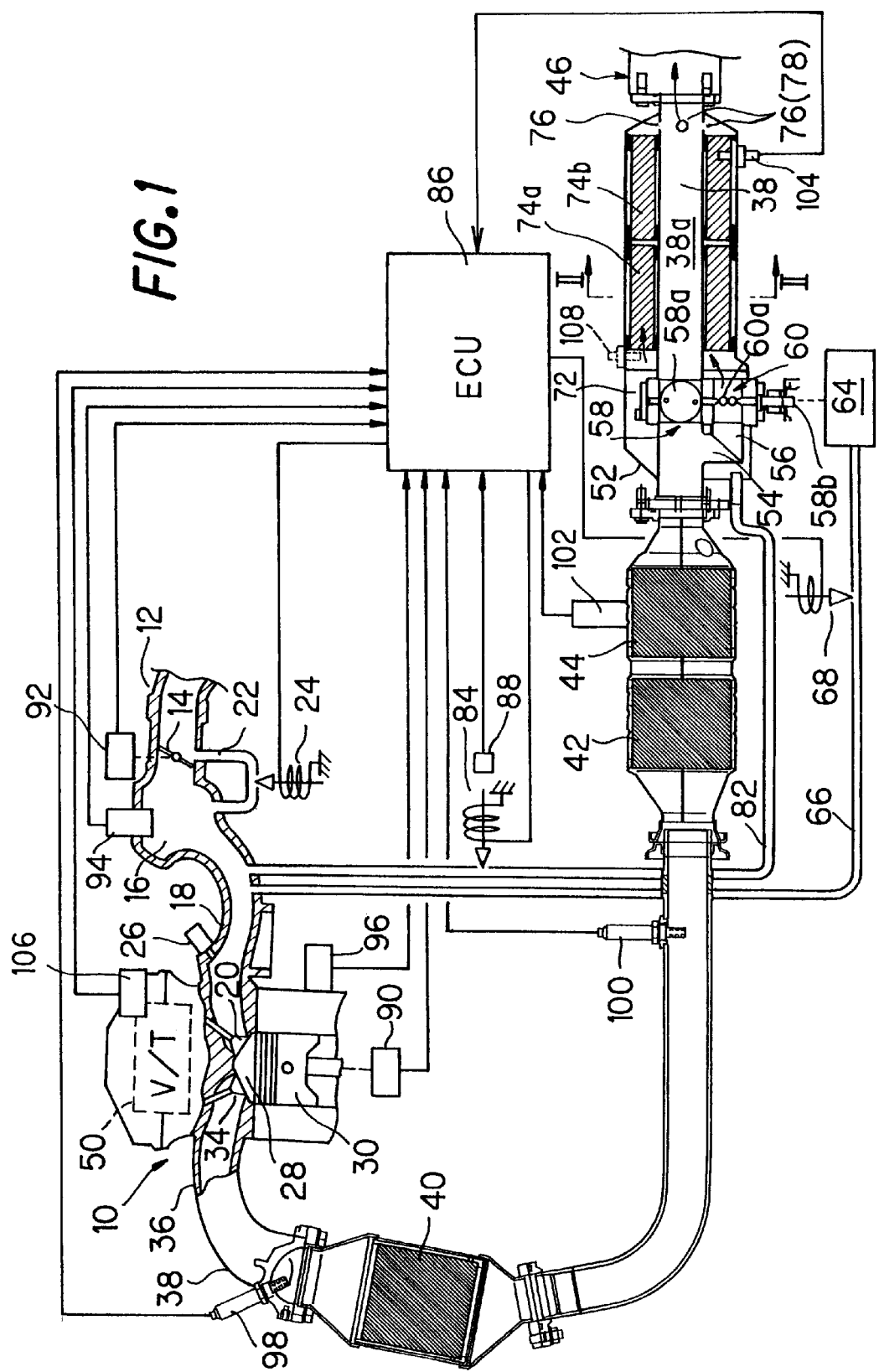
FIG. 1 is an overall schematic view showing an exhaust gas purification system of an internal combustion engine according to the present invention having an adsorbent installed in the engine exhaust system which adsorbs the unburned components such as hydrocarbons generated by the engine.

FIG. 1 is an overview of an exhaust gas purification system of an internal combustion engine according to the invention.

Reference numeral 10 in this figure designates an overhead cam (OHC) in-line four-cylinder internal combustion engine. Air drawn into an air intake pipe or passage 12 through an air cleaner (not shown) mounted separately is supplied to the first to fourth cylinders (only one is shown) through a surge tank 16, an intake manifold 18 and two intake valves 20 (only one is shown), while the flow thereof is adjusted by a throttle valve 14. The throttle valve 14 is bypassed by a bypass 22 provided at the air intake pipe 12. A valve (EACV) 24 comprised of an electromagnetic solenoid valve is installed in the bypass 22 for closing the same.

A fuel injector 26 is installed in the vicinity of the intake valves 20 of each cylinder for injecting fuel in to a combustion chamber 28 of the cylinder concerned. The injected fuel mixes with the intake air to form an air-fuel mixture that is supplied into the cylinder chamber and is ignited there by a spark plug (not shown). The resulting combustion of the air-fuel mixture drives a piston 30 downward in the figure.

The exhaust gas produced by the combustion is discharged through two exhaust valves 34 (only one is shown) into an exhaust manifold 36, from where it passes through an exhaust pipe or passage 38 to a first catalyst (catalytic converter) 40 installed immediately below the exhaust manifold 36 and a second catalyst 42 and a third catalyst 44 (all three-way catalytic converters) where noxious components are removed therefrom before it is discharged to the atmosphere via a vehicle rear assembly 46 including a muffler and a tail pipe (neither shown).

The engine 10 is equipped with a variable valve timing mechanism 50 (illustrated as "V/T" in FIG. 1). The variable valve timing mechanism 50 switches the opening/closing timing of the intake and/or exhaust valves between two types of timing characteristics, a characteristic for low engine speed and a characteristic for high engine speed, in response to the engine speed NE and the absolute manifold pressure PBA. Since this is a well-known mechanism, however, it will not be described further here.

The exhaust pipe 38 is connected with a chamber 52, in a cylindrical shape, at a location downstream of the third catalyst 44. More specifically, the exhaust pipe 38 is branched off downstream of the third catalyst 44 to form a branch 54. The branch 54 is connected to the chamber 52 which is air-tightly connected to the exhaust pipe 38 to surround the same. With this, there are formed, as passages for exhaust gas flow, a main exhaust gas passage 38a passing through the inside of the exhaust pipe 38 and a bypass exhaust gas passage 56 passing through the inside of the branch 54 and the inner space of the chamber 52.

A combination of valves are provided in the vicinity of the branching point, i.e., in terms of exhaust gas flow, at the entrance of the chamber 52. The combination of valves comprises of, an exhaust pipe valve 58 which opens/closes the main exhaust gas passage 38a and a bypass valve 60 which opens/closes the bypass exhaust gas passage 56. More precisely, the valves 58, 60 are of butterfly-type (like the throttle valve 14) and the valve 58 is comprised of a first disk (vane) 58a, and the valve 60 is comprised of a second disk (vane) 60a. A shaft 58b is provided to connect the first and second disks 58a, 60a. The disks 58a, 60a are connected to the shaft 58b at right angles (90 degrees) with each other such that when the first disk 58a (i.e., the valve 58) closes the main exhaust gas passage 38a, the second disk 60a (i.e., the valve 60) opens the bypass exhaust gas passage 56. And vice versa, when the first disk 58a (the valve 58) opens the main exhaust gas passage 38a, the second disk 60a (the valve 60) closes the bypass exhaust gas passage 56.

The shaft 58b is connected to a valve actuator 64. The valve actuator 64 has a conduit 66 which is connected to the air intake pipe 12 at a location downstream of the throttle valve 14. The valve actuator 64 operates the exhaust pipe valve 58 to close the main exhaust gas passage 38a and the bypass valve 60 to open the bypass exhaust gas passage 56, when a negative pressure is introduced from the intake air pipe 12 through the conduit 66. In other words, unless a negative pressure is introduced in the actuator 64, the exhaust pipe valve 58 is forced to open the main exhaust gas passage 38a and the bypass valve 60 is forced to close the bypass exhaust gas passage 56, as shown in FIG. 1.

An electromagnetic solenoid valve (referred to later as "TRPV") 68 is installed in the conduit 66, which opens/closes the conduit in response to a command generated by and sent from an Electronic Control Unit (referred to later as "ECU") 86. Thus, the valve actuator 64 operates to open or close the valve 58, 60.

The chamber 52 is configured to completely encircle the exhaust pipe 38 such that a space (the aforesaid inner space) 72 is formed along the exhaust pipe 38 between the exhaust pipe 38 and the chamber 52. An adsorbent 74, comprising a first half 74a and a second half 74b each carried on a carrier or bed in honeycomb shape, is housed in the space 72 at a position downstream or close to the vehicle rear assembly 46.

The adsorbent 74 is preferably made from a material comprised of a mixture of crystalline aluminosilicate and a catalyzer element, preferably a mixture of ZSM-5 zeolite and a catalyzer element as is proposed by the assignee in Japanese Laid-Open Patent Application No. Hei 8 (1996)-71,427.

The crystalline aluminosilicate is heat-resistant to a temperature of 900° C. to 1000° C. and exhibits excellent heat-proof property compared to the active carbon used in the prior art. The adsorbent 74 adsorbs the unburned components such as hydrocarbons (hereinafter referred to "HC") in the exhaust gas under low ambient temperature, i.e., when the exhaust system temperature is at or below 100° C. and desorbs or releases the captured HC at the exhaust system temperature of 100° C. to 250° C.

Figure 2:
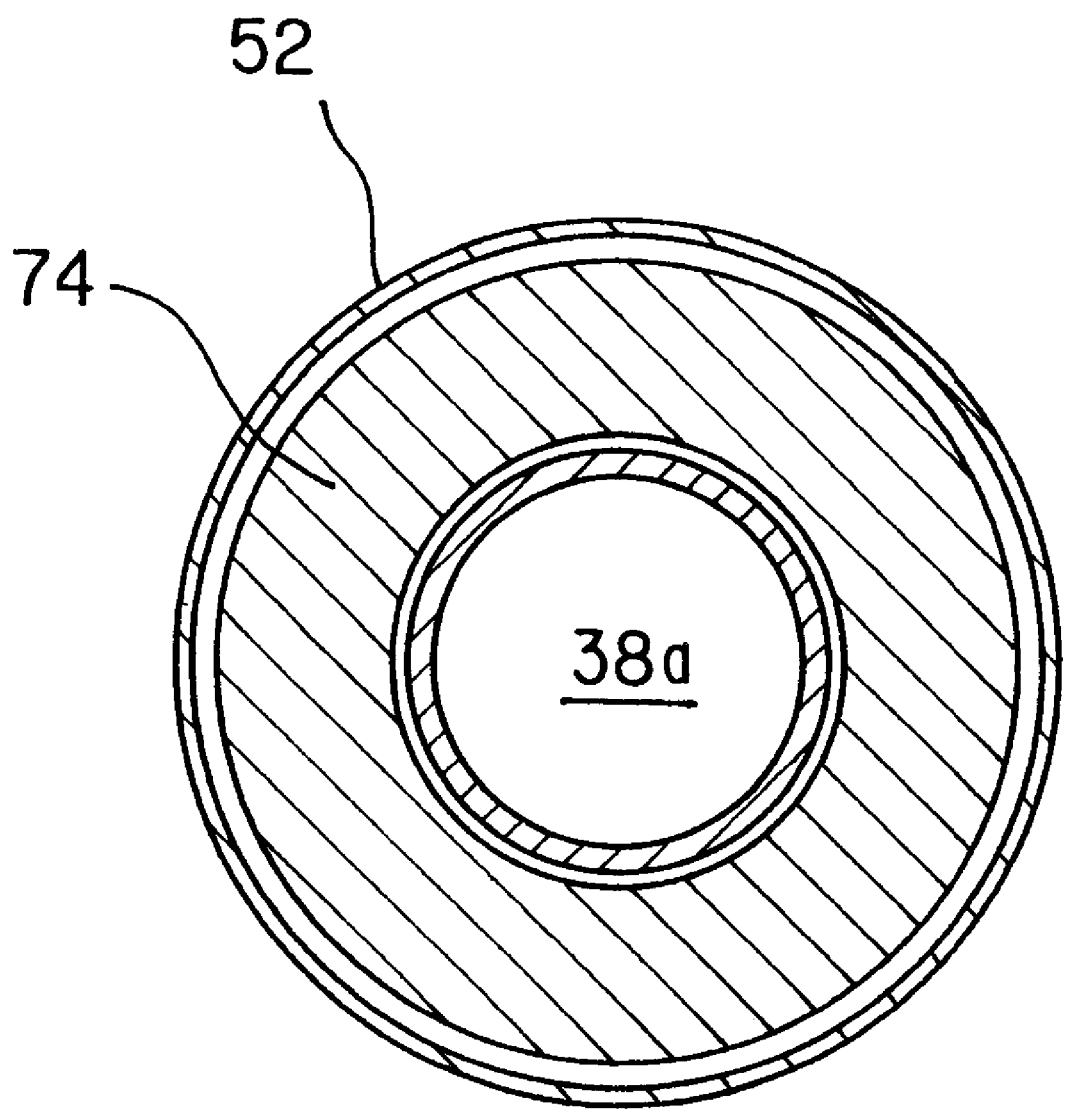
FIG. 2 is a cross-sectional view taken along the line II—II in FIG. 1.

The exhaust pipe 38 is provided, at its far end, with four holes 76 which are circumferentially located at intervals of 90 degrees. The bypass exhaust gas passage 56 is thus formed from the branch 54 and extends into the chamber 52 (the space 72) via the adsorbent 74 up to holes 76 (a confluence point 78) where it merges into the main exhaust gas passage 38a in the exhaust pipe 38. As illustrated in FIG. 2, the chamber is circular in cross section and encircles the exhaust pipe 38 in such a manner that the adsorbent 74 is positioned as close to the exhaust pipe 38 as possible to receive heat such that it desorbs or releases the adsorbed HC to be recirculated (purged) to the engine air intake system.

The chamber is connected, at or near the entrance, i.e., at a position upstream of the adsorbent 74, to an EGR conduit 82. The EGR conduit 82 is connected, at the other end, to the air intake pipe 12 at a position downstream of the throttle valve 14. The EGR conduit 82 is provided with an EGR control valve (electromagnetic solenoid valve) 84 which closes the conduit in response to a command generated by and sent from the ECU 86. The amount of lifting or stroke of the valve 84 is sensed by a lift sensor 88 and based on the sensed value, the ECU 86 controls the quantity of EGR flow.

The ignition distributor (not shown) of the engine 10 is provided with a crank angle sensor 90 which generates a signal indicative of Top Dead Center of the piston 30 and a signal indicative of unit angles divided into smaller values. The engine 10 is further provided with a throttle position sensor 92 which generates a signal indicative of the degree of opening θTH of the throttle valve 14, a manifold absolute pressure (MAP) sensor 94 which generates a signal indicative of the aforesaid absolute manifold pressure PBA of the intake manifold downstream of the throttle valve 14 in terms of absolute value, and a coolant temperature sensor 96 installed in the vicinity of a coolant passage (not shown) of the engine which generates a signal indicative of the temperature TW of the engine coolant.

Further, an universal air/fuel ratio sensor 98 (named LAF sensor) is provided in the exhaust pipe 38 at or downstream of a confluence point of the exhaust manifold 36 and upstream of the first catalyst 40, where it generates a signal indicative of the oxygen concentration in the exhaust gas, as explained later. In addition, an $O_2$ sensor 100 is installed in the exhaust pipe 38 at a location downstream of the first catalyst 40, which generates a signal indicative of the oxygen concentration in the exhaust gas, as explained later.

Furthermore, a temperature sensor 102 is installed in the vicinity of the third catalyst 44 and generates a signal indicative of the catalyst temperature TCAT in the exhaust system. Another temperature sensor 104 is installed in the adsorbent at a location close to the distal end of the second half 74b, but at a position upstream of the distal end by a certain distance, and generates a signal tmp.trs indicative of the temperature of the adsorbent 74. And, a valve timing sensor 106 is provided in a hydraulic pressure circuit of the variable valve timing mechanism 50 and generates a signal indicating which characteristic is selected.

These output signals generated by the sensors are forwarded to the ECU 86.

Figure 3:
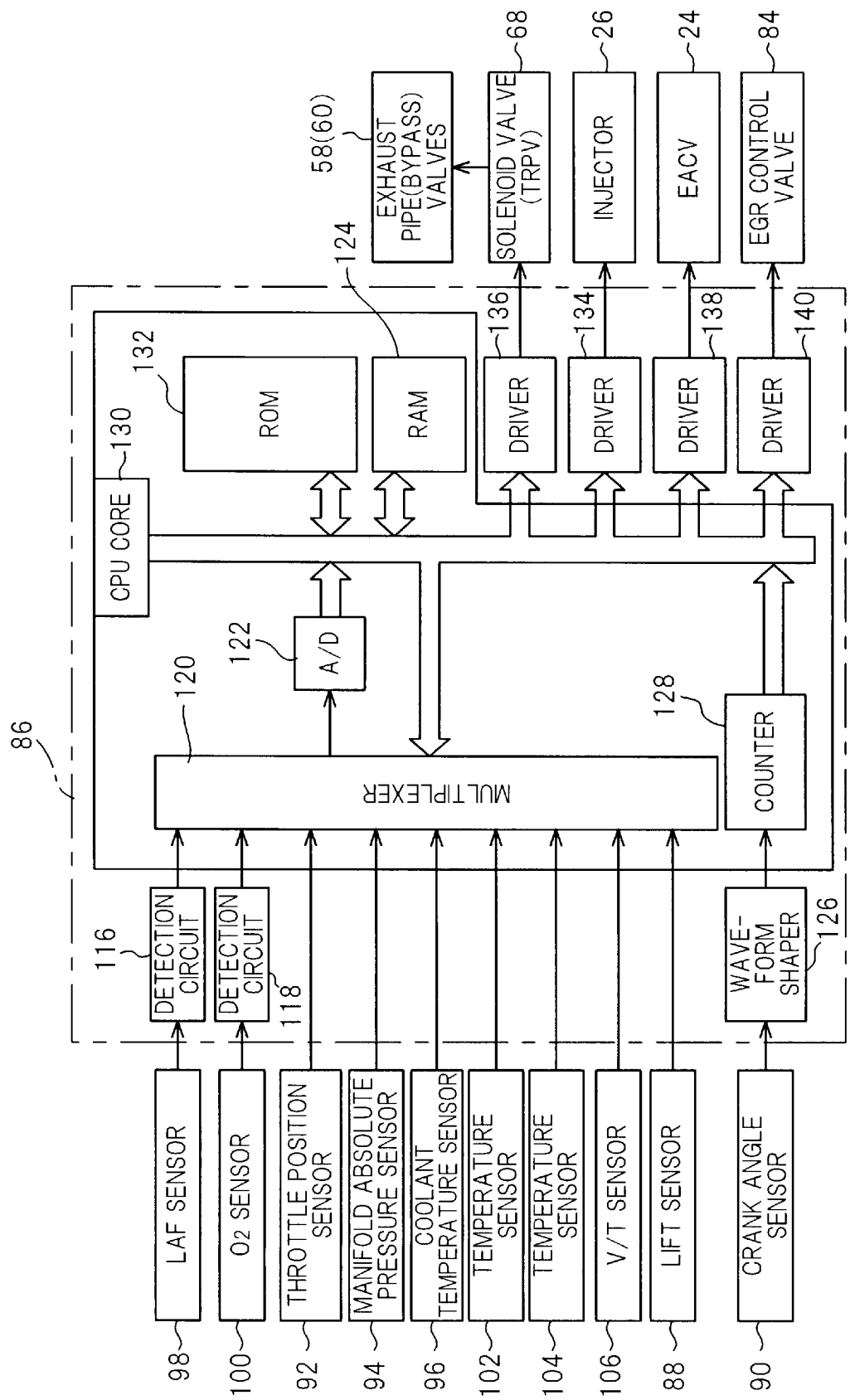
FIG. 3 is a block diagram showing the details of an electronic control unit (ECU) illustrated in FIG. 1.

Details of the ECU 86 are shown in the block diagram of FIG. 3.

The output of the LAF sensor 98 is received by a first detection circuit 116, where it is subjected to appropriate linearization processing for producing an output characterized in that it varies linearly with the oxygen concentration of the exhaust gas over a broad range extending from lean to rich. The output of the $O_2$ sensor 100 is input to a second detection circuit 118 which generates a switching signal indicating that the air/fuel ratio in the exhaust gas emitted from the engine 10 is rich or lean with respect the stoichiometric air/fuel ratio.

The output of the first detection circuit 116 is forwarded through a multiplexer 120 and an A/D converter 122 to a RAM (random access memory) 124 in a CPU (central processing unit). Specifically, the CPU has a CPU core 130, a ROM (read-only memory) 132 and the RAM 124, and the output of the first detection circuit 116 is A/D-converted and stored in buffers of the RAM 124. Similarly, the output of the second detection circuit 118 and the analog outputs of the throttle position sensor 92, etc., are input to the CPU through the multiplexer 120 and the A/D converter 122 and stored in the RAM 124.

The output of the crank angle sensor 90 is shaped by a wave-form shaper 126 and has its output value counted by a counter 128. The count is input to the CPU and the engine speed NE is detected or calculated from the count. In accordance with commands stored in the ROM 132, the CPU core 130 computes a manipulated variable and drives the fuel injectors 26 of the respective cylinders via a driver 134.

The CPU core 130 also drives the electromagnetic valve (TRPV) 68 via driver 130 to open/close the exhaust pipe valve 58 (and the bypass valve 60) through the valve actuator 64, and drives the EACV 24 and the EGR control valve 84 through drivers 138, 140. Moreover, the CPU core 130 discriminates whether the adsorbent 84 deteriorates, as explained below.

Figure 4:
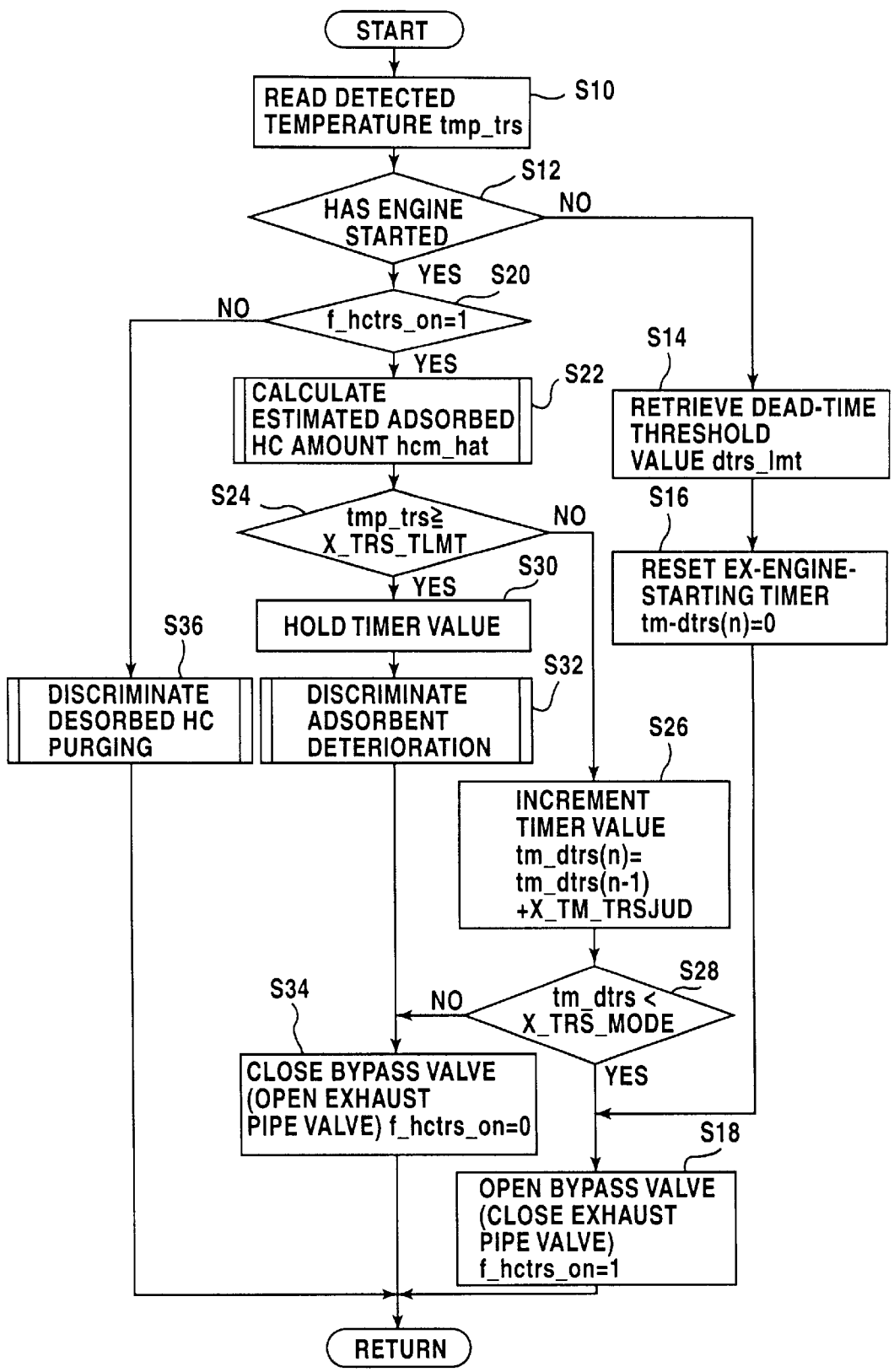
FIG. 4 is a flow chart showing the operation of the system illustrated in FIG. 1, more specifically, the discrimination whether the adsorbent deteriorates.

FIG. 4 is a flow chart showing the operation of the system, more precisely, the discrimination of deterioration of the adsorbent 74.

Before entering into the explanation of the figure, the operation will be described as follows.

Figure 5:
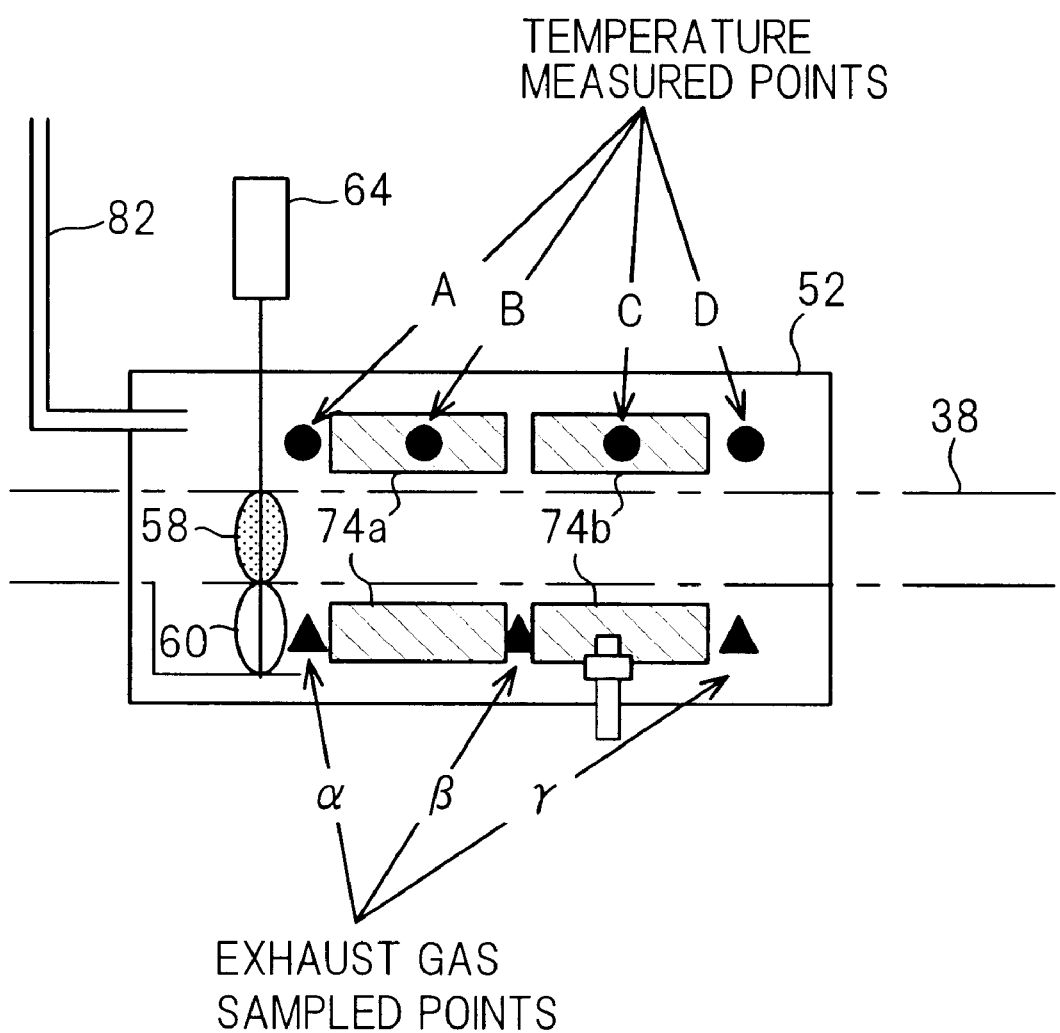
FIG. 5 is an explanatory view showing temperature-measuring points at or near the adsorbent installed in the engine exhaust system for explaining the deterioration discrimination in the system according to the present invention.

FIG. 5 is an explanatory view showing the adsorbent 74 housed in the chamber 52. The inventors measured the temperatures at four points A, B, C, D and the discharged HC amounts (the amount of HC desorbed from the adsorbent 74) at three points, α, β, γ, illustrated in the figure, and obtained the results as illustrated in FIG. 6.

Here, A indicates the point upstream and outside of the first half 74a of the adsorbent 74, B indicates the point in the first half 74a of the adsorbent 74, C indicates the point in the second half 74b of the adsorbent 74, and D indicates the point downstream and outside of the second half 74b of the adsorbent 74. And α indicates the point at a similar position to A, β indicates the point between the first half 74a and the second half 74b of the adsorbent 74, and γ indicates the point at a similar position to D.

Figure 6:
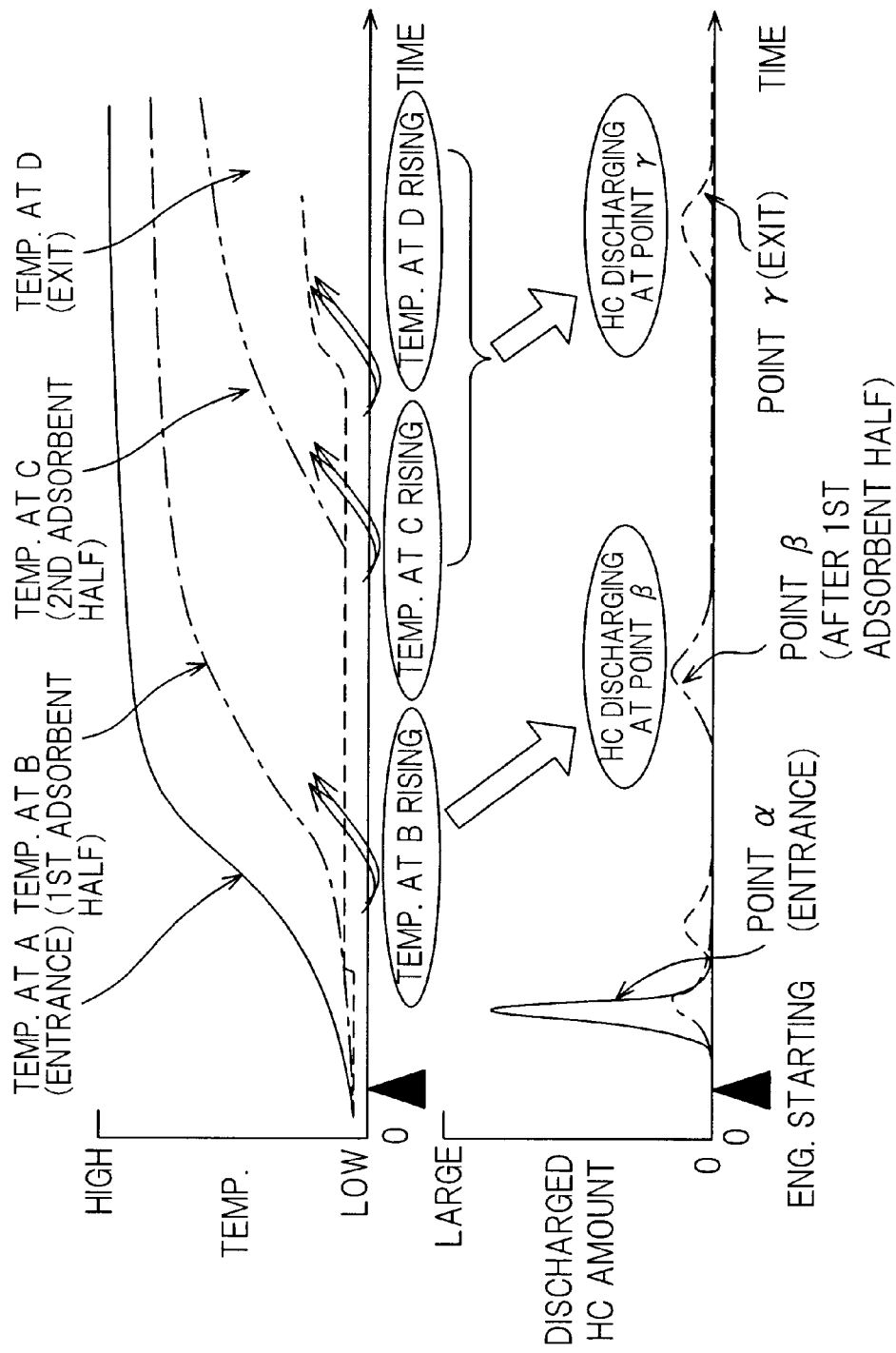
FIG. 6 is an explanatory time chart showing the change of temperature measured in the manner illustrated in FIG. 5.

Briefly explaining the behavior of adsorbent temperature, as illustrated in FIG. 6, the adsorbent temperature rises little during adsorbing, but rises sharply after the adsorbed amount has reached the limit of adsorbing capacity, i.e., a saturation point. In other words, the results indicate that the HC discharging due to adsorbent desorption at a position downstream of the individual adsorbent halves, i.e., at the points γ and γ, occurs after the temperatures upstream of these points (i.e., the points B and C) or at positions downstream thereof (i.e., the point D) have begun rising.

Figure 7:
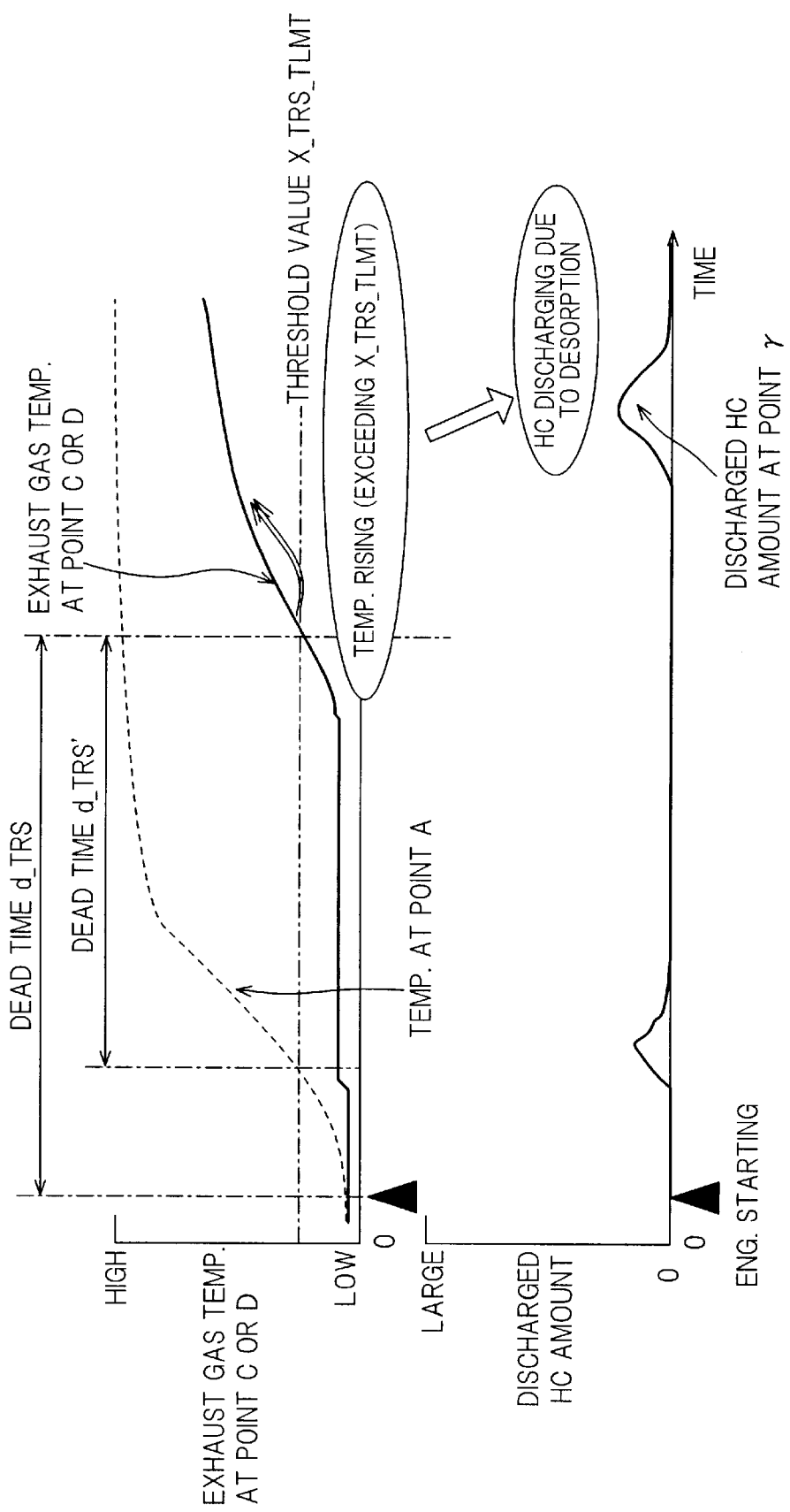
FIG. 7 is a view, similar to FIG. 6, but similarly showing the behavior of the measured temperature more specifically.

Thus, since the adsorbent temperature has a certain dead time (delay), it will be possible to detect the HC discharging from the adsorbent 74 due to the desorption reaction (elimination reaction) by sensing the temperature at or downstream of the second half 74b of the adsorbent 74, i.e., the temperature at C or D, as illustrated in FIG. 7. More specifically, predetermining an appropriate threshold value X.TRS.TLMT, as illustrated in FIG. 7, it will be possible to discriminate that the HC discharging from the first and second halves of the adsorbent 74 due to desorption, has begun when it is determined that the temperature at the second adsorbent half 74b exceeds the threshold value.

The above is a well-known fact.

The inventors made the present invention not based on this well-known fact, but based on the fact that the adsorbent temperature or the exhaust gas temperature downstream thereof remains unchanged while the HC adsorption is in progress.

Specifically, noting the fact that the temperature at the second adsorbent half 74b or the exhaust gas temperature downstream thereof has a delay or dead time (d.TRS, d.TRS') with respect to the engine starting (or the exhaust gas temperature upstream of the first adsorbent half 74a as will be explained with reference to a second embodiment), the inventors configured the invention to conduct discrimination of adsorbent deterioration.

Figure 8:
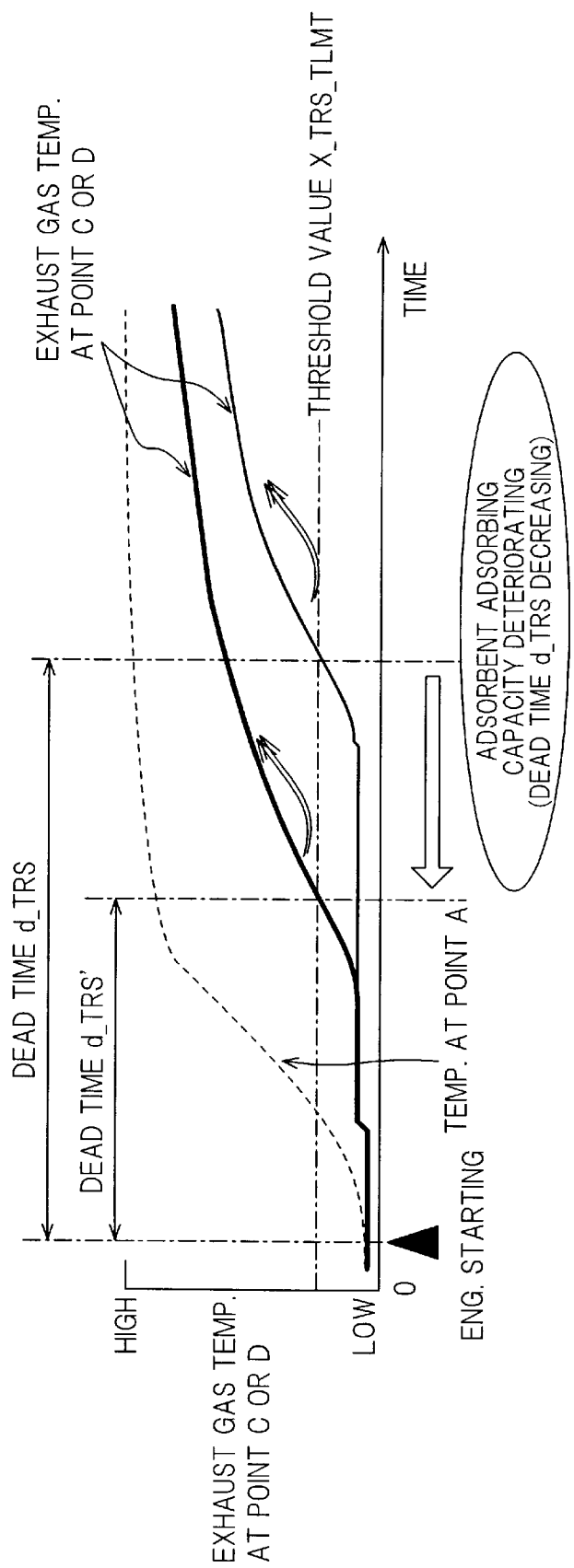
FIG. 8 is a view, similar to FIG. 6, but similarly showing the behavior of the measured temperature more specifically.

More specifically, it is noteworthy that, since the dead time (d.TRS, d.TRS') is caused by the HC adsorption reaction with the adsorbent 74, as illustrated in FIG. 8, the dead time decreases as the adsorption capacity of the adsorbent 74 deteriorates. This can be understood from FIG. 6 where the temperature rise as seen at point C lags behind the temperature rise as seen at point B. In other words, the temperature at a point of greater absorption capacity begins to rise late.

Figure 9:
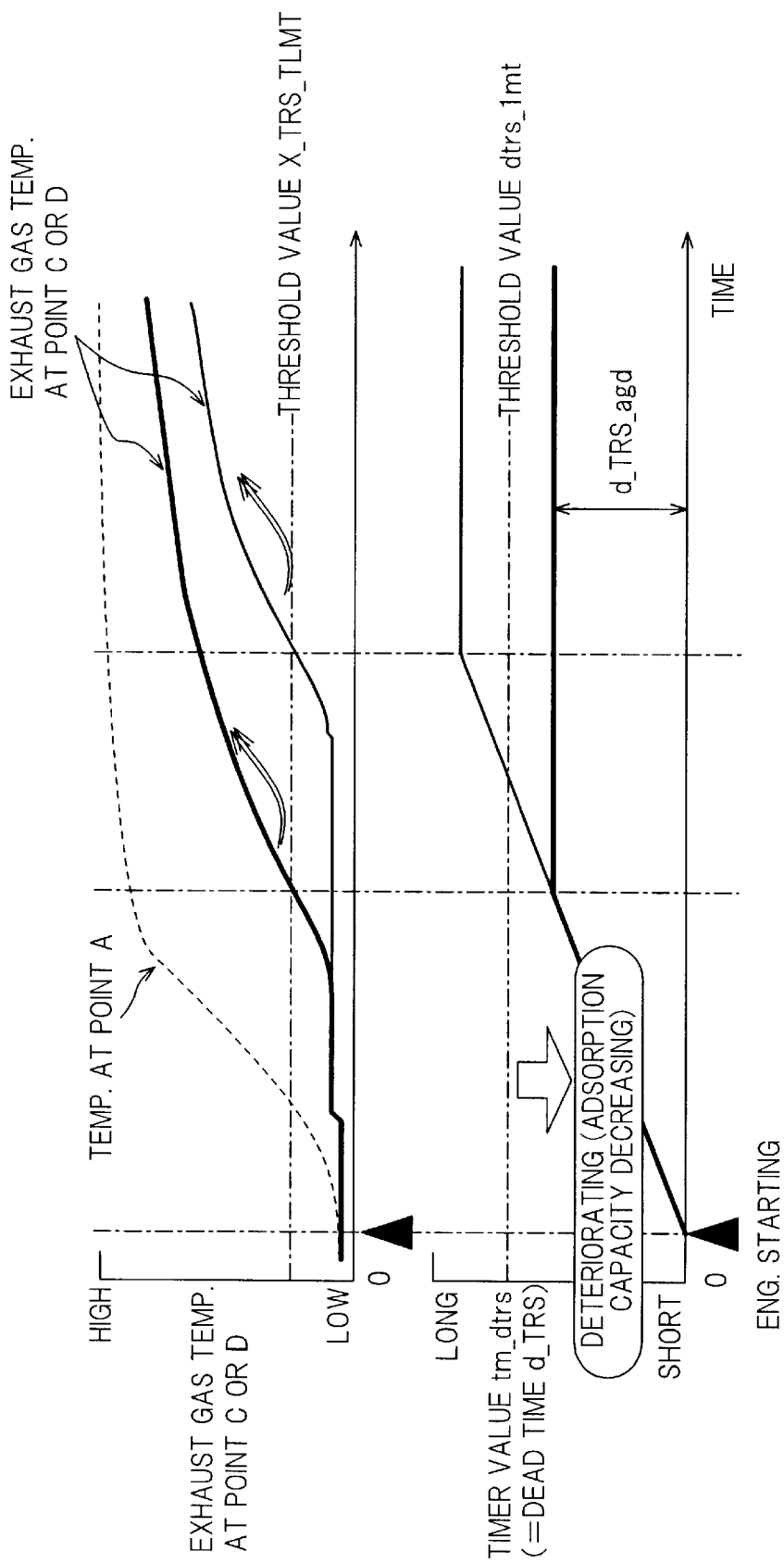
FIG. 9 is a view, similar to FIG. 6, but similarly showing the behavior of the measured temperature more specifically.

Thus, the present invention is based on the finding that the dead time (d.TRS, d. TRS') shortens as the adsorbing capacity of the adsorbent 74 deteriorates. From that reason, the system is configured such that, as illustrated in FIG. 9, the temperature at the point C is measured (by the sensor 104) and a timer tm.dtrs (which is corresponding to the aforesaid dead time d.TRS, d.TRS') is used to measure the elapse time until the detected temperature becomes greater or equal to a threshold value X.TRS.LMT. In the system, when the timer value tm.dtrs becomes less than an appropriately set dead-time threshold value dtrs.lmt, it is discriminated that the adsorption capacity of the adsorbent 74 has decreased, in other words, the adsorbent 74 has deteriorated.

Based on the above, the operation of the system, more precisely, the discrimination of adsorbent deterioration conducted by the ECU 86 will be explained with reference to the flow chart of FIG. 4.

The ECU 86 starts operation when the ignition switch is made on and executes the program once every 50 msec.

The program begins at S10 in which the temperature tmp.trs (the output of the temperature sensor 104 installed at the point C) is read and proceeds to S12 in which it is determined whether the engine 10 has started.

This is done by determining whether the engine 10 has started cranking and the fuel injection has been started. If the cranking has been started, but the fuel injection has not been started, it is determined that the engine 10 has not started. (This may alternatively be done by comparing the detected engine speed NE with a predetermined speed (e.g., 400 rpm) indicating that the combustion has completed and by determining that the engine 10 has started if the detected engine speed is greater or equal to the predetermined speed.)

Figure 10:
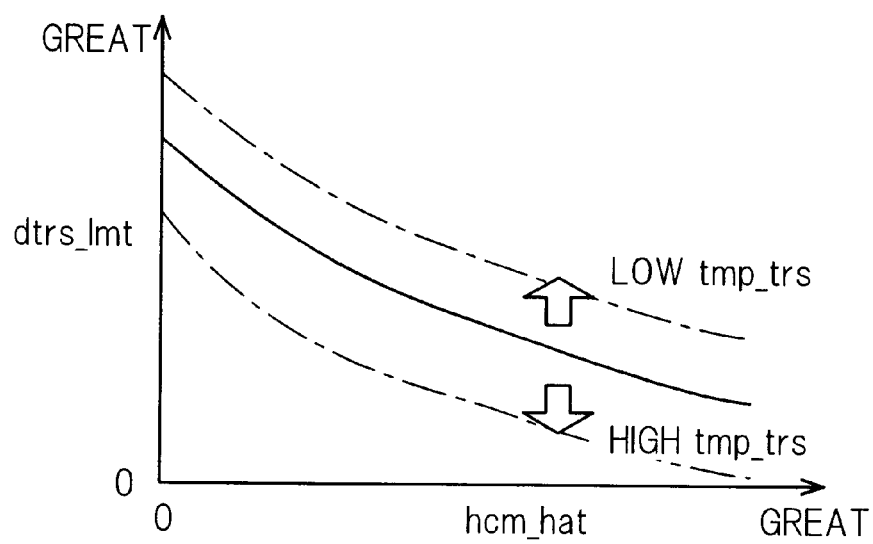
FIG. 10 is an explanatory graph showing characteristics of a threshold value referred to in the flow chart of FIG. 4.

When the result in S12 is negative indicating that the engine has not started, the program proceeds to S14 in which the aforesaid temperature-rise-dead-time threshold value dtrs.lmt is retrieved from a table. FIG. 10 shows the characteristics of the table. As illustrated, the dead-time threshold value dtrs.lmt is retrieved using an estimated adsorbed HC amount (an estimated amount of HC adsorbed on the adsorbent 74) hcm.hat [g] and the detected temperature tmp.trs.

With this, since the adsorption capacity of the adsorbent 74 varies with the (estimated) adsorbed HC amount hcm.hat and the (detected) temperature tmp.trs, the dead-time threshold value dtrs.lmt can be determined properly, thereby enabling to discriminate the deterioration of the adsorbent 74 accurately.

As mentioned above, the estimated adsorbed HC amount hcm.hat is the amount of HC estimated to be adsorbed in the adsorbent 74, whose calculation will be explained later. For simplicity, although three kinds of the threshold value characteristics are illustrated, it is alternatively possible to prepare four or more kinds of characteristics or other characteristic obtained by interpolating the three.

The program proceeds to S16 in which a value tm.dtras(n) of an ex-engine-starting timer (the aforesaid timer, sometimes referred to as "ex-engine-starting timer for adsorbent-deterioration discrimination") is reset to zero. As mentioned above, the timer measures the time until the detected temperature tmp.trs, after engine starting, becomes greater or equal to a temperature-rise-discrimination threshold value X.TRS.TLMT.

In this specification and figures, the suffix "n" means a sampling number in the discrete-time system, specifically, the time at which the program of FIG. 4 flow chart is executed, more specifically, (n) indicates the current program-execution-time and (n−1) indicates the preceding program-execution-time. For brevity, addition of (n) to values at the current time is often omitted.

Returning to the explanation of FIG. 4, the program proceeds to S18 in which the valve actuator 64 causes the bypass valve 60 to be opened to open the bypass exhaust gas passage 56, while the exhaust pipe valve 58 is closed to block the exhaust gas from flowing into the main exhaust gas passage 38*a*. At the same time, flag f.hctrs.on is set to 1 indicating that the bypass exhaust gas passage 56 is open.

When the result in S12 is affirmative in the next or later program loop, since this means that the engine 10 has started, the program proceeds to S20 in which it is determined whether the flag f.hctrs.on is set to 1. Since the flag was just set to 1 in S18, the result is naturally affirmative, the program proceeds to S22 in which the estimated adsorbed HC amount hcm.hat [g] is calculated.

Figure 11:
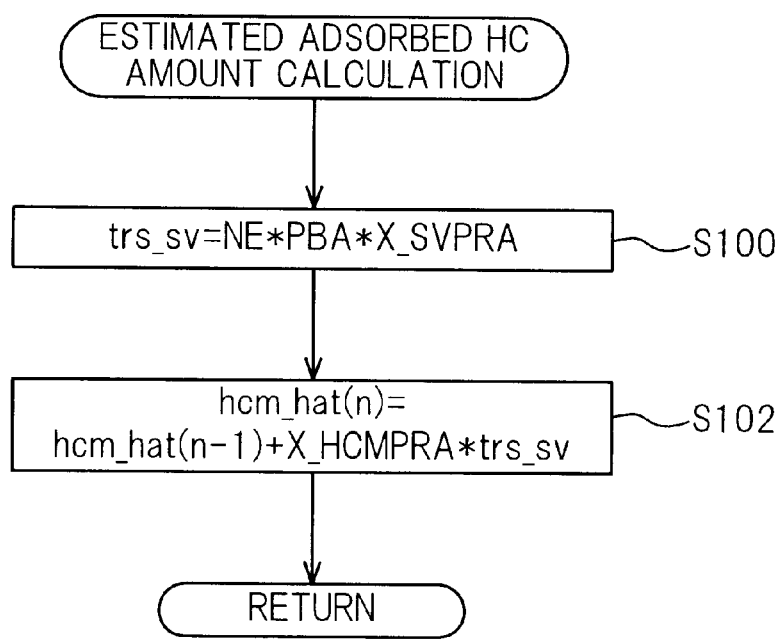
FIG. 11 is a flow chart showing the subroutine for calculation of an estimated adsorbed hydrocarbon amount referred to in the flow chart of FIG. 4.

FIG. 11 is a flow chart showing the subroutine for this calculation.

Explaining this, an estimated value trs.sv of exhaust gas in volume, more specifically its space velocity (the relationship between feed rate and reactor volume in a flow process; defined as the volume or weight of feed per unit time per unit volume of reactor (per unit weight of catalyst)), is calculated. As illustrated, the estimated exhaust gas volume trs.sv is calculated by multiplying the detected engine speed NE by the detected manifold absolute pressure PBA and a coefficient X.SVPRA. This is a simple approximation of exhaust gas volume (space velocity).

The coefficient is, for example, 65.74 when the engine 10 is a 2.2 litter engine.

The program then proceeds to S102 in which a value X.HCMPRA and the estimated exhaust gas volume trs.sv just calculated are multiplied and the resultant product is added to the preceding value of the estimated adsorbed HC amount hcm.hat (n−1) to calculate the current value of the estimated adsorbed HC amount hcm.hat (n). Since the estimated adsorbed HC amount hcm.hat is updated, this value is stored in the backup portion of the RAM 124 to be held even after the engine 10 was stopped.

The value X.HCMPRA is an estimated parameter of HC concentration. This estimated parameter may be corrected by the degree of activation of the catalysts 40, 42, 44 determined by the catalyst temperature TCAT, or by the engine operating conditions determined by the intake air temperature TA, the atmospheric pressure PA, the temperature of Automatic Transmission Fluid, or by the environment conditions around the engine 10.

Again returning to the explanation of FIG. 4, the program proceeds to S24 in which it is determined whether the detected temperature tmp.trs becomes greater or equal to the aforesaid temperature-rise-discrimination threshold value X.TRS.TLMT (e.g., 60° C.), in other words, it is checked if the detected temperature begins rising.

When the result in S24 is negative, since this indicates that the adsorbent 74 is adsorbing HC, the program proceeds to S26 in which a predetermined value X.TM.TRSJUD is added to the preceding value of the ex-engine-starting timer (ex-engine-starting timer for adsorbent-deterioration discrimination) tm.dtrs (n−1) to increment the same.

The program then proceeds to S28 in which it is determined whether the timer value tm.dtrs is less than a predetermined value X.TRS.MODE. This predetermined value X.TRS.MODE indicates a time limit for adsorption, more precisely, an expected time limit (e.g., 20 sec) for adsorption of the adsorbent 74 after the engine 10 has started, but the catalysts activation is in progress. This predetermined value X.TRS.MODE may be varied with the engine operating conditions determined by the coolant temperature TW, the intake air temperature TA, the atmospheric pressure PA, the catalyst temperature TCAT and some similar parameters. When the result in S28 is affirmative, since this indicates that it is within the time limit, the program proceeds to S18.

When the result in S24 is affirmative, on the other hand, since this indicates that the adsorbed HC begins desorbing, the program proceeds to S30 in which the aforesaid timer value tm.dtrs is held or kept, to S32 in which it is discriminated whether the adsorbent 74 has deteriorated.

Figure 12:
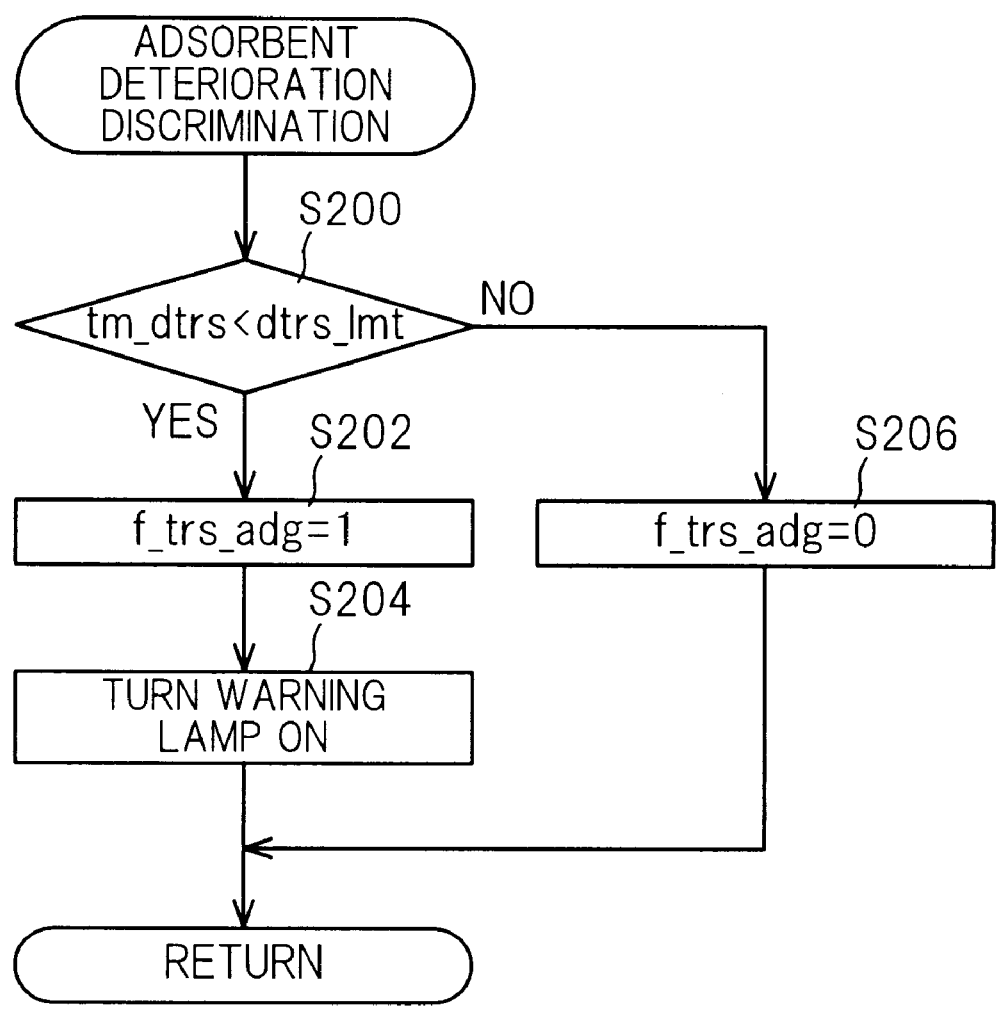
FIG. 12 is a flow chart showing the subroutine of discrimination of adsorbent deterioration referred to in the flow chart of FIG. 4.

FIG. 12 is a flow chart for the subroutine of this discrimination.

Explaining this, the program begins in S200 in which it is determined whether the timer value tm.dtrs is less than the aforesaid temperature-rise-dead-time threshold value dtrs.lmt. When the result is affirmative, since this indicates that the temperature rise is early, specifically, the absorption amount decreases, more specifically, it can be discriminated that the adsorbent 74 has deteriorated, the program proceeds to S202 in which the bit (initially 0) of a flag f.trs.agd is set to 1, and to S204 in which a warning lamp (not shown in FIG. 1) is turned on to alert this to the vehicle operator.

On the other hand, when the result in S200 is negative, since this indicates that the temperature rise is late, specifically, the absorption amount does not decreases, more specifically, it can be discriminated that the adsorbent 74 has not deteriorated, the program proceeds to S206 in which the bit of the flag f.trs.agd is reset to 0.

Returning to the explanation of FIG. 4, the program proceeds to S34 in which the bypass valve 60 is closed through the valve actuator 64 to block the exhaust gas from flowing into the bypass exhaust gas passage 56, while the exhaust pipe valve 58 is opened to introduce the exhaust gas into the main exhaust gas passage 38a. At the same time the bit of the flag f.hctrs.on is reset to 0 indicating that the bypass exhaust gas passage 56 is closed.

This is because the supply of exhaust gas to the adsorbent 74 should necessarily be discontinued as soon as possible when the amount of adsorbed HC has reached its limit, since the adsorption can no longer be expected, no matter whether the adsorbent 74 has deteriorated or not. If the supply of exhaust gas to the adsorbent 74 is nevertheless continued, HC desorbed from the adsorbent 74 would be emitted out of the engine 10. However, since the operation is configured in the way described above, the system can effectively prevent the desorbed HC from being emitted to the air.

When the result in S28 is negative, since this means that the time limit has expired, the program proceeds to S34 to close the bypass exhaust gas passage 56 for the same reason.

Accordingly, the result in S20 is negative in the next or later program loop, the program proceeds to S36 in which it is discriminated whether the desorbed HC should be purged (recirculated) into the engine intake system.

Figure 13:
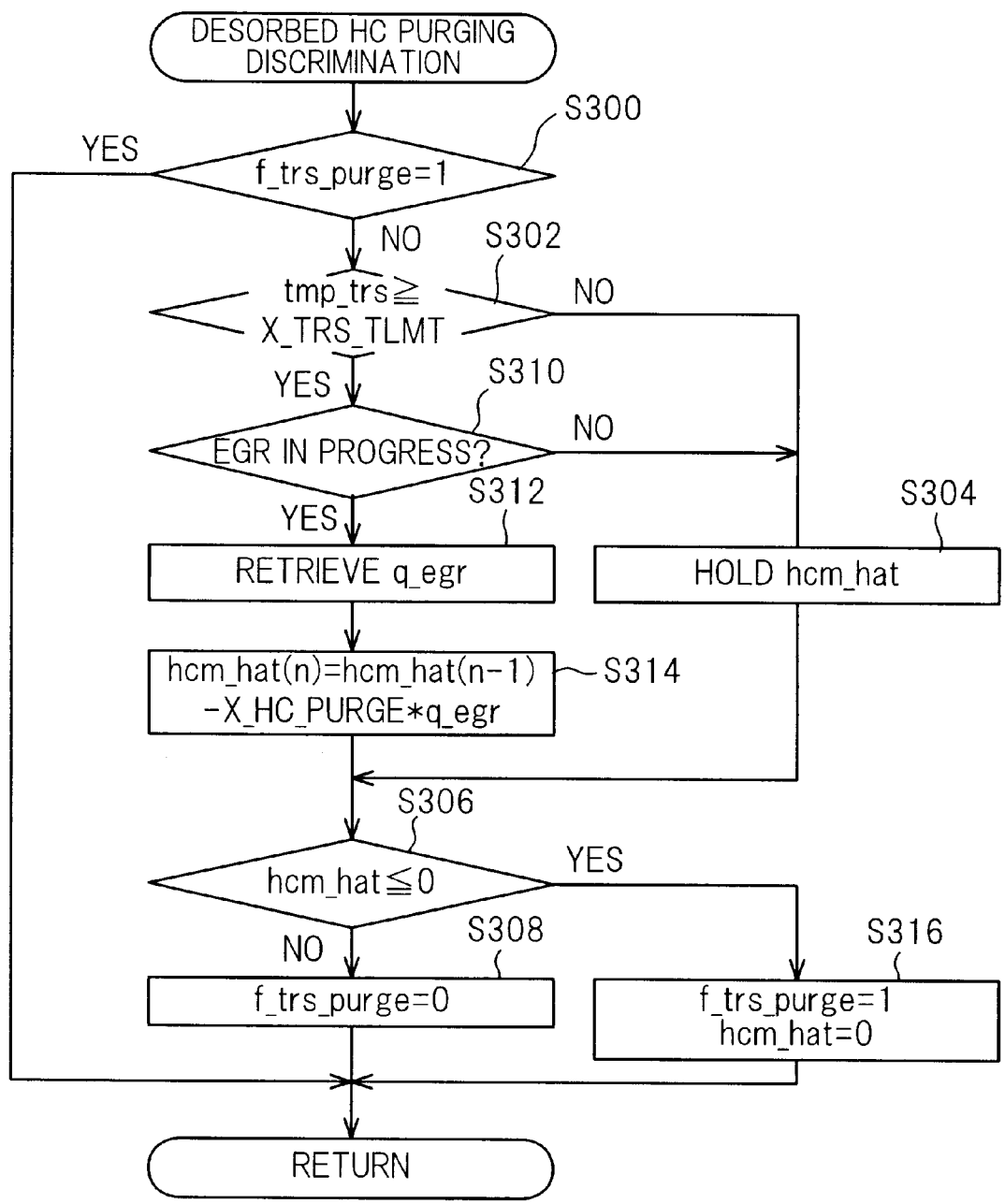
FIG. 13 is a flow chart showing the subroutine for discrimination of purging of adsorbed hydrocarbons referred to in the flow chart of FIG. 4.

FIG. 13 is a flow chart showing the subroutine for this discrimination.

The program begins in S300 in which it is determined whether the flag f.trs.purge is set to 1. As will be explained later, the flag is set to 1 when it is determined that the purging has been completed, i.e, the recirculation of the desorbed HC into the engine air intake system has been completed.

When the result in S300 is negative, since this indicates that the purging has not been completed, the program proceeds to S302 in which it is again determined whether the detected temperature tmp.trs is less than the temperature-rise-discrimination threshold value X.TRS.TLMT, in other words, it is checked if the desorption reaction has started.

When the result in S302 is negative, the program proceeds to S304 in which the estimated adsorbed HC amount hcm.hat is held or kept, to S306 in which it is determined whether the estimated adsorbed HC amount hcm.hat is less than or equal to zero. The result is normally negative and the program proceeds to S308 in which the bit of the flag f.trs.purge is reset to 0.

When the result in S302 is affirmative in the next or later program loop, the program proceeds to S310 in which it is determined whether the EGR (Exhaust Gas Recirculation) is in progress. In this system, the EGR is conducted at appropriate engine operating conditions and the desorbed HC is purged into the engine intake system together with the recirculated exhaust gas. Since, however, the EGR itself has no direct relationship with the basic substance of the present invention, no further explanation is made.

When the result in S310 is negative, since no desorbed HC can be purged to the engine intake system, the program proceeds to S304 and on. When the result in S310 is affirmative, on the other hand, the program proceeds to S312 in which an estimated quantity of EGR flow (estimated value of the recirculated quantity of exhaust gas flow) q.egr [g] is retrieved (calculated) from a table.

Figure 14:
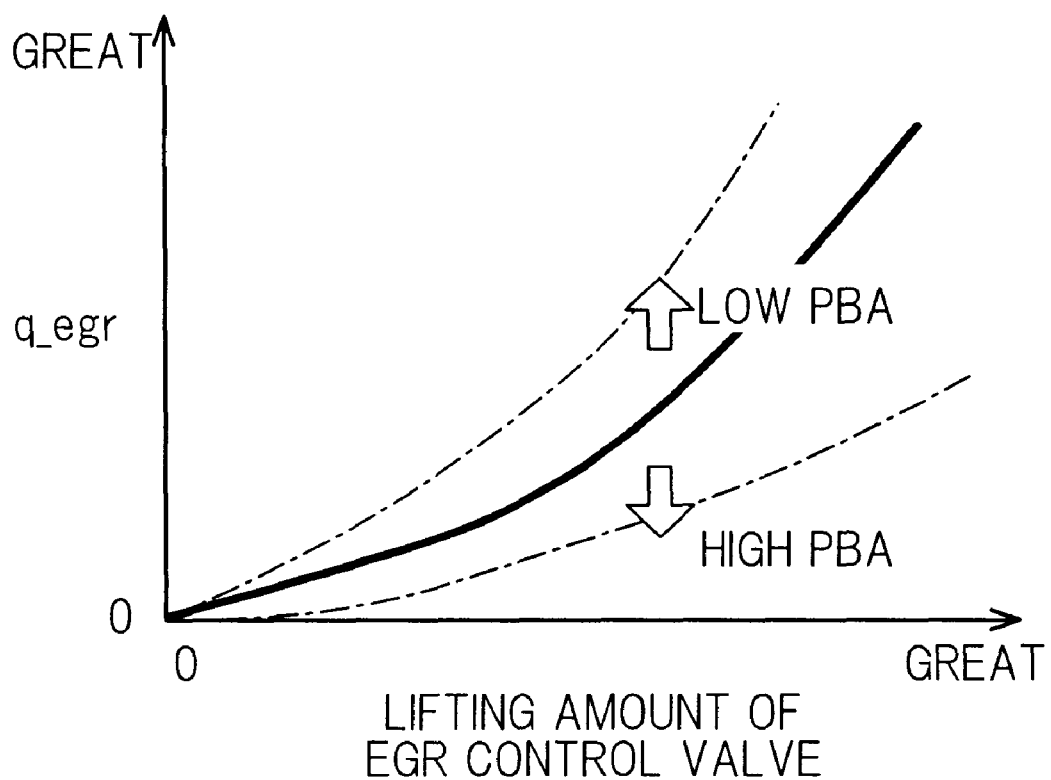
FIG. 14 is an explanatory graph showing characteristics of an estimated quantity of EGR flow referred to in the flow chart of FIG. 13.

FIG. 14 shows the characteristics of the table. As illustrated, the estimated quantity of EGR flow q.egr is determined by retrieval from the table, using the amount of lifting (more precisely, the command of amount of lifting generated by the ECU 86) of the EGR control valve 84 and the detected manifold absolute pressure PBA.

Similar to FIG. 10, although only three kinds of characteristics are shown with respect to the manifold absolute pressures, for brevity, four or more kinds of characteristics are, in fact, used. It is alternatively possible to correct the estimated quantity of EGR flow q.egr, thus calculated, by the parameter indicative of exhaust gas pressure such as the atmospheric pressure and/or the exhaust gas temperature.

The program next proceeds to S314 in which the estimated quantity of EGR flow q.egr is multiplied by a value X.HC.PURGE and the product is subtracted from the preceding value of the estimated adsorbed HC amount hcm.hat (n−1) to determine the current value of the estimated adsorbed HC amount hcm.hat (n). Specifically, since the desorbed HC is purged into the engine air intake system through the EGR, the estimated adsorbed HC amount is decreased by the recirculated amount.

The value X.HC.PURGE is a parameter for estimating the quantity of desorbed HC in the quantity of EGR flow. (It is alternatively possible to correct this parameter by the engine operating conditions determined by the detected (or estimated) temperature tmp.trs, detected (or estimated) temperature or quantity of heat of the exhaust gas, the air/fuel ratio feedback correction coefficient and some similar parameters.)

The program then proceeds to S306 in which it is determined whether the estimated adsorbed HC amount, thus corrected, is less than or equal to zero, and when the result is negative, the program proceeds to S308. When the result in S306 is affirmative, the program proceeds to S316 in which the bit of the flag f.trs.purge is set to 1. As a result, the result in S300 is affirmative in the next or later program loop and the program is immediately terminated.

Having been configured in the foregoing manner, the system according to the embodiment can discriminate the deterioration of the adsorbent 74 accurately. Moreover, when the adsorbed amount of HC has reached its limit, the supply of exhaust gas to the adsorbent 74 should necessarily be discontinued as immediately as possible, irrespectively of whether the adsorbent 74 has deteriorated or not, since the adsorbent 74 can adsorb no more. If the supply of exhaust gas to the adsorbent 74 is nevertheless continued, HC desorbed from the adsorbent 74 would be emitted out of the engine 10. However, since the operation is configured as described above, the system can effectively prevent the desorbed HC from being emitted to the air.

Figure 15:
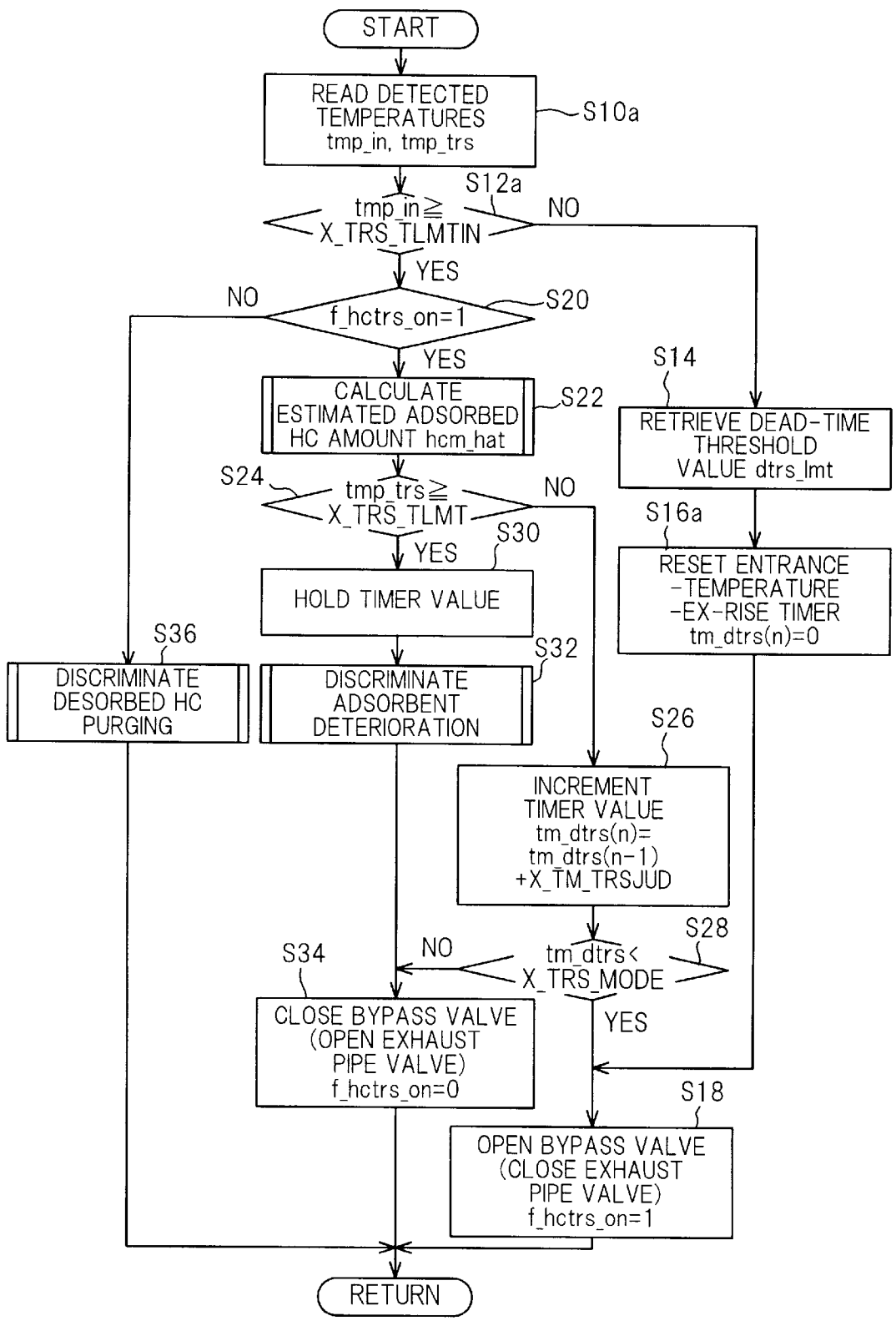
FIG. 15 is a view, similar to FIG. 4, but showing the operation of an exhaust gas purification system according to a second embodiment of the present invention.

FIG. 15 is a flow chart, similar to FIG. 4, but showing the operation of the exhaust gas purification system according to a second embodiment of the present invention.

In the second embodiment, a second temperature sensor 108 is added at a position upstream of the first half 74a of the adsorbent 74, as illustrated by phantom lines in FIG. 1. More specifically, in addition to the temperature at the point C in FIG. 5, the temperature at the point A at the entrance of the chamber 52 is measured.

Explaining the operation of the system according to the second embodiment with reference to the flow chart of FIG. 15, while putting emphasis on the differences from the first embodiment, the program begins at S10a in which the output temp.in (indicative of the chamber entrance temperature) of the second temperature sensor 108 and the aforesaid output temp.trs of the first temperature sensor 104 are read.

The program then proceeds to S12a in which it is determined whether the detected temperature tnp.in (chamber entrance temperature) is greater or equal to an entrance-temperature-rise-discrimination threshold value X.TRS.T-LMTIN (e.g., 60° C.).

When the result in S12a is negative, the program proceeds to S14 in which the dead-time threshold value is retrieved from the table, to S16a in which the aforesaid timer (renamed in the second embodiment as "entrance-temperature-ex-rise timer) is reset to zero, and to S18 and on.

On the other hand, when the result in S12a is affirmative, the program proceeds to S20 in which it is determined whether the flag bit is set to 1 similarly to the first embodiment, and depending on the result, the program proceeds to S22 or S36.

Since the discrimination of adsorbent deterioration is conducted based on the timing at which the adsorbent temperature begins rising in the system according to the present invention, it becomes necessary to estimate or detect the time at which the supply of exhaust gas flow is started. In the first embodiment, the time is estimated by that at which the engine 10 has started. In the second embodiment, the second temperature sensor 108 is provided and the time is estimated from the detected entrance temperature in a more direct manner. Specifically, this is done, in S12a of the flow chart of FIG. 15, by determining whether the chamber entrance temperature is greater or equal to the threshold value.

Having been configured in the foregoing manner, although the system in the second embodiment is more complicated in configuration than that in the first embodiment, the system in the second embodiment can estimate the time at which the supply of exhaust gas flow is started more directly. In other words, since the system in the second embodiment is not suffered from the influence on the variance in engine starting time, it can discriminate the deterioration of the adsorbent 74 more accurately. The rest of the configuration as well as the effect and advantages is the same as that of the first embodiment.

Figure 16:
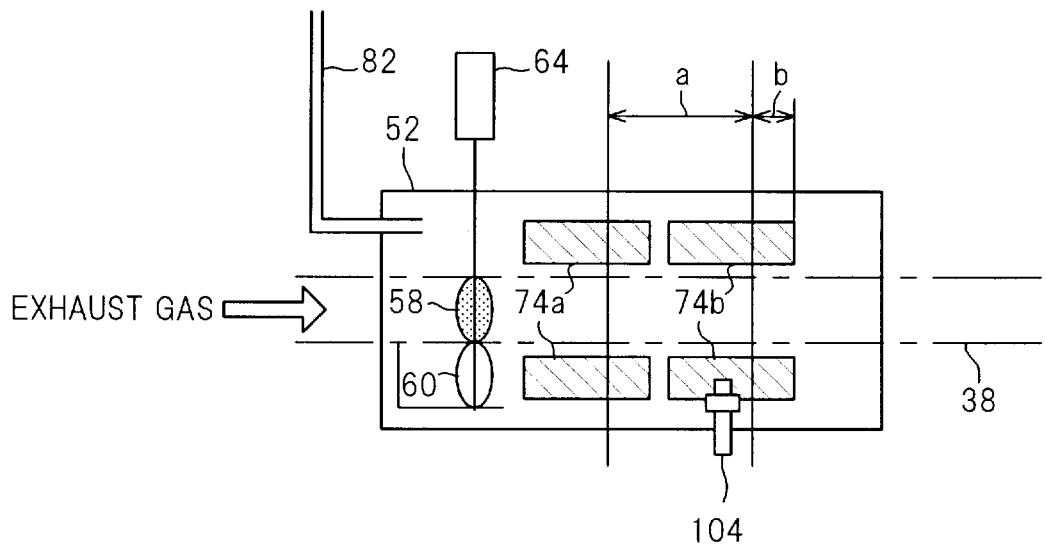
FIG. 16 is an explanatory view, similar to FIG. 4, but showing temperature-measuring points at or near the adsorbent in the first and second embodiments of the system according to the present invention.

Here, adding the explanation onto the position of the first temperature sensor 104 to be positioned downstream of the adsorbent 74, the first temperature sensor 104 should preferably be installed, as illustrated in FIG. 16, at a location within a range marked by "a" in the figure. In other words, the sensor should be placed at a position upstream by a distance "b" from the distal end of the second half 74b of the adsorbent 74.

The reason is first that, since the discrimination of adsorbent deterioration according to the present invention is based on the temperature-rise dead time, the discrimination accuracy enhances as the dead time in absolute value becomes large, i.e., the adsorbent adsorption capacity up to the location where the temperature sensor is installed, increases.

The reason is secondly that, the system is configured such that the bypass valve 60 is placed at the entrance of chamber 52 upstream of the adsorbent 74. Therefore, if the temperature sensor 104 is placed just at the distal end of the second half 74b of the adsorbent 74, since the bypass valve 60 is kept open until the temperature detected by the sensor 104 begins rising, if the absorbent temperature rises to a value which allows the adsorbed HC to desorb, the desorbed HC would be emitted to the air.

From these reasons, the temperature sensor 104 is placed at the adsorbent second half 74b at a position close to its distal end, but before by a distance (corresponding to "b" in FIG. 16) therefrom. Thus, by leaving a certain portion of adsorbent 74 downstream of the sensor position, when the temperature detected by the sensor has reached a point to begin rising, since the left adsorbent portion has not reached to the temperature for desorption, the HC desorbed from a portion upstream of the sensor position will be again adsorbed or trapped by the downstream left portion, thereby preventing the desorbed HC from being emitted immediately to the air.

Figure 17:
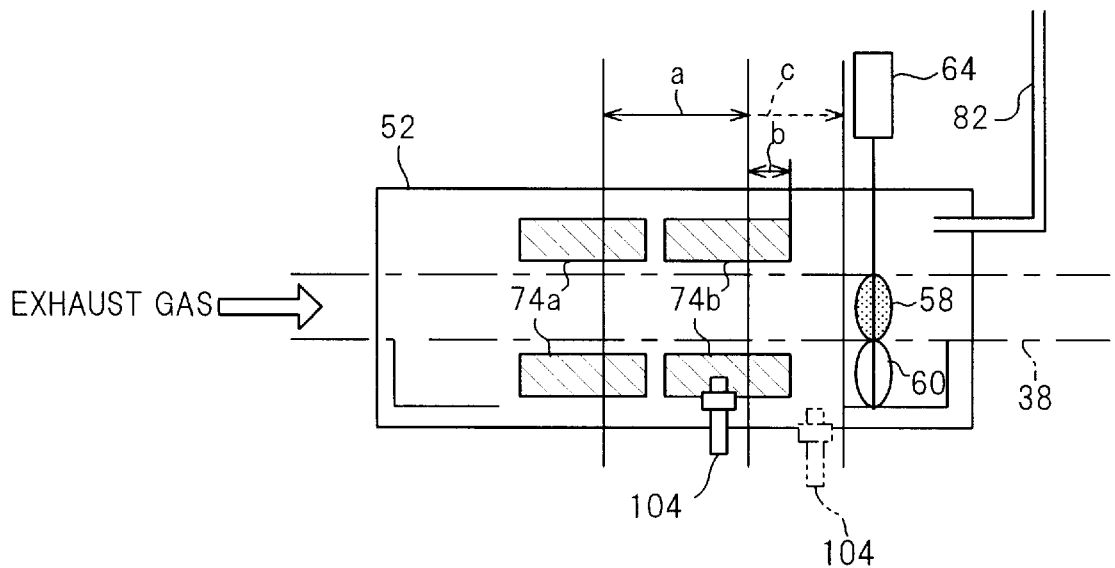
FIG. 17 is an explanatory view, similar to FIG. 4, but showing temperature-measuring points at or near the adsorbent in a configuration which is different form the first and second embodiments of the system according to the present invention.

Saying the above in reverse, assuming that the system is configured such that the bypass valve 60 is placed downstream of the adsorbent second half 74b, as illustrated in FIG. 17, it would be possible to install the temperature sensor 104 at its distal end or at a position downstream thereof as shown by phantom lines in a range "c", since this configuration can decrease the desorbed HC emission to the least extent if the valve 60 is immediately closed when the temperature has reached the point of beginning to rise.

However, from the reasons mentioned above, the temperature sensor should preferably be located at a position upstream by "b" from the adsorbent second half even when the system is configured as illustrated in FIG. 17. The same applies whether the system is configured to have the bypass valve installed either upstream or downstream of the absorbent.

The first and second embodiments are configured to have a system for purifying exhaust gas generated by an internal combustion engine (10) having an adsorbent (74), installed in an exhaust system of the engine, which adsorbs unburned components (HC) of the exhaust gas generated by the engine when the engine has started, including: a branch (54) which branches off an exhaust pipe (38) of the exhaust system of the engine and stores the adsorbent; a valve (60) provided at the branch; and valve control means (ECU 86, S18, S24, S28, S34) for controlling the valve to close or open the branch. The characterizing features are that the system includes a first temperature sensor (104) for detecting at least one of a temperature of the adsorbent (tmp.trs) and a temperature at a location downstream of the adsorbent; time measuring means (ECU 86, S16, S16a, S24, S26) for measuring a time (tm.dtrs) until the detected temperature becomes greater or equal to a predetermined value (X.TRS.TLMT); and adsorbent deterioration discriminating means (ECU 86, S32, S200) for discriminating whether the adsorbent deteriorates based on at least the measured time.

In the system, the time measuring means measures the time until the detected temperature becomes greater or equal to the predetermined value after supply of exhaust gas to the adsorbent is started (S12, S12a).

The system further includes: engine starting determining means (ECU 86, S12) for determining whether the engine has started; and exhaust gas supply starting determining means (ECU 86, S12) for determining that the supply of exhaust gas to the adsorbent is started when the engine is determined to have been started.

The system further includes: a second temperature sensor (108) for detecting a second temperature (tmp.in) upstream of the adsorbent; and exhaust gas supply starting determining means (ECU 86, S12a) for determining that the supply of exhaust gas to the adsorbent is started based on the second temperature.

In the system, the exhaust gas supply starting determines means includes: temperature comparing means (ECU 86, S12a) for comparing the second temperature with a threshold value (X.TRS.TLMTIN); and determines that the supply of exhaust gas to the adsorbent is started when the second temperature is determined to be greater or equal to the threshold value.

In the system, the adsorbent deterioration discriminating means includes: comparing means (ECU 86, S32, S200) for comparing the measured time with a threshold value (dtrs.lmt); and discriminates whether the adsorbent deteriorates based on a result of comparison.

The system further includes: estimated adsorbed unburned component amount calculating means (ECU 86, S14) for calculating an estimated adsorbed unburned component amount adsorbed by the adsorbent (hcm.hat); and threshold determining means (ECU 86, S14) for determining the threshold value (dtrs.lmt) based on at least the calculated estimated adsorbed unburned component amount.

In the system, the threshold determining means determines the threshold value (dtrs.lmt) based on the temperature detected by the first temperature sensor (tmp.trs) and the estimated absorbed unburned component amount (hcm.hat).

In the system, the adsorbent deterioration discriminating means discriminates that the adsorbent deteriorates when the measured time (tm.dtrs) is less than the threshold value (dtrs.lmt).

In the system,the valve control means controls the valve to close the branch based on at least the detected temperature (S24).

In the system, the valve control means includes: temperature comparing (ECU 86, S24) for comparing the detected temperature (tmp.trs) with the threshold value (X.TRS.TLMT); and wherein the valve control means (ECU 86, S24) controls the valve to close the branch when the detected temperature is greater or equal to the threshold value (S34).

The system further includes: time measuring means (ECU 86, S16, S16a) for measuring a time since supply of exhaust gas to the adsorbent is started; and wherein the valve control means (ECU 86, S28) controls the valve to close the branch when the measured time (tm.dtrs) is greater or equal to a predetermined value (X.TM.TRSJUD).

In the above, it should be noted that, although the deterioration of the adsorbent 74 is discriminated by measuring the temperature at the point C (or A and C) shown in FIG. 5, it will suffice to merely discriminate the adsorbent deterioration if any temperature among from the points A, B, C and D is used.

It should also be noted that, although the beginning of desorption reaction is determined, in the first and second embodiments, based on the temperature in S302 of the flow chart of FIG. 13, this may be done, in the second embodiment, by estimating the overall temperature (the first and second halves 74a, 74b) of the adsorbent 74 based on the chamber entrance temperature temp. in indicative of the first half 74a of the adsorbent 74.

It should further be noted that the bypass valve or the exhaust pipe valve may be opened or closed by an electric actuator.

It should further be noted that the adsorbent should not be limited to the type disclosed, any other type may be used if it has an excellent heat-proof property.

While the invention has thus been shown and described with reference to specific embodiments, it should be noted that the invention is in no way limited to the details of the described arrangements but changes and modifications may be made without departing from the scope of the appended claims.

What is claimed is:

1. The system for purifying exhaust gas generated by an internal combustion engine having an adsorbent installed at a bypass exhaust gas passage branched from an exhaust pipe of the engine and merged into the exhaust pipe at a location downstream of the absorbent, the bypass exhaust gas passage being opened by a switch-over valve at a start of the engine to introduce the exhaust gas such that the adsorbent adsorbs unburned HC in exhaust gas generated by the engine and being closed such that the adsorbent desorbs the adsorbed HC and the desorbed HC is thereafter recirculated at a position upstream of a catalyst comprising:

a first temperature sensor for detecting at least one of a temperature of the adsorbent and a temperature at a location downstream of the adsorbent;

time measuring means for measuring a time until the detected temperature becomes greater or equal to a predetermined value; and adsorbent deterioration discriminating means for discriminating whether the adsorbent deteriorates by comparing the measured time with a threshold value and discriminates whether the adsorbent deteriorates based on a result of comparison.

2. The system according to claim 1, wherein the time measuring means measures the time until the detected temperature becomes greater or equal to the predetermined value after supply of exhaust gas to the adsorbent is started.

3. The system according to claim 2, further including:

engine starting determining means for determining whether the engine has started; and exhaust gas supply starting determining means for determining that the supply of exhaust gas to the adsorbent is started when the engine is determined to have been started.

4. The system according to claim 2, further including:

a second temperature sensor for detecting a second temperature upstream of the adsorbent; and exhaust gas supply starting determining means for determining that the supply of exhaust gas to the adsorbent is started based on the second temperature.

5. The system according to 4, wherein the exhaust gas supply starting determines means includes:

temperature comparing means for comparing the second temperature with a threshold value;

and determines that the supply of exhaust gas to the adsorbent is started when the second temperature is determined to be greater or equal to the threshold value.

6. The system according to claim 1, wherein the adsorbent deterioration discriminating means includes:

estimated adsorbed unburned component amount calculating means for calculating an estimated adsorbed unburned component amount adsorbed by the adsorbent; and threshold determining means for determining the threshold value based on at least the calculated estimated adsorbed unburned component amount.

7. The system according to claim 6, wherein the threshold determining means determines the threshold value based on the temperature detected by the first temperature sensor and the estimated absorbed unburned component amount.

8. The system according to claim 1, wherein the adsorbent deterioration discriminating means discriminates that the adsorbent deteriorates when the measured time is less than the threshold value.

9. The system according to claim 1, wherein the adsorbent deterioration discriminating means turns a warning lamp on when the adsorbent is discriminated to be deteriorated.

10. The system for purifying exhaust gas generated by an internal combustion engine having an adsorbent, installed in an exhaust system of the engine, which adsorbs unburned components of the exhaust gas generated by the engine and to be emitted out of the engine through an exhaust pipe of the exhaust system, comprising:

a branch which branches off an exhaust pipe of the exhaust system of the engine and stores the adsorbent;

a temperature sensor for detecting at least one of a temperature of the adsorbent and a temperature at a location downstream of the adsorbent;

a valve provided at the branch; and valve control means for controlling the valve to close the branch based on at least the detected temperature;

wherein the valve control means includes:

temperature comparing means for comparing the detect ed temperature with a threshold value; and time measuring means for measuring a time since supply of the exhaust gas to the adsorbent has started;

and the valve control means controls the valve to close the branch when the detected temperature is greater or equal to the threshold value or when the measured time is greater or equal to a predetermined value.

11. The method of purifying exhaust gas generated by an internal combustion engine having an adsorbent installed in a bypass exhaust gas passage branched from an exhaust pipe of the engine and merged into the exhaust pipe at a location downstream of the adsorbent, the bypass exhaust gas passage by opened by a switch-over valve at a start of the engine to introduce the exhaust gas such that the adsorbent adsorbs unburned HC in exhaust gas generated by the engine being closed such that the adsorbent desorbs the adsorbed HC and the desorbed HC is thereafter recirculated at a position upstream of a catalyst, comprising the steps of:

detecting at least one of a temperature of the adsorbent and a temperature at a location downstream of the adsorbent;

measuring a time until the detected temperture becomes greater or equal to a predetermined value; and discriminating whether the adsorbent deteriorates based on at least the measured time;

wherein the discriminating step includes the steps of:

comparing the measured time with a threshold value; and discriminating whether the adsorbent deteriorates based on a result of comparison.

12. The method according to claim 11, wherein the step of measuring measures the time until the detected temperature becomes greater or equal to the predetermined value since supply of exhaust gas to the adsorbent is started.

13. The method according to claim 12, further including the steps of:

determining whether the engine has started; and determining that the supply of exhaust gas to the adsorbent is started when the engine is determined to have been started.

14. The method according to claim 12, further including the steps of:

detecting a second temperature upstream of the adsorbent; and determining that the supply of exhaust gas to the adsorbent is started based on the second temperature.

15. The method according to 14, wherein the step of exhaust gas supply starting determining includes the step of:

comparing the second temperature with a threshold value;

and determining that the supply of exhaust gas to the adsorbent is started when the second temperature is determined to be greater or equal to the threshold value.

16. The method according to claim 11, further including the steps of:

calculating an estimated adsorbed unburned component amount adsorbed by the adsorbent; and determining the threshold value based on at least the calculated estimated adsorbed unburned component amount.

17. The method according to claim 16, wherein the step of threshold determining, determines the threshold value based on the temperature detected by the first temperature sensor and the estimated absorbed unburned component amount.

18. The method according to claim 11, wherein the step of adsorbent deterioration discriminating, discriminates that the adsorbent deteriorates when the measured time is less than the threshold value.

19. The method of purifying exhaust gas generated by an internal combustion engine having an adsorbent, installed in an exhaust system of the engine, which adsorbs unburned components of the exhaust gas generated by the engine, having:

a branch which branches off an exhaust pipe of the exhaust system of the engine and stores the adsorbent; and a valve provided at the branch;

wherein the method comprises the steps of:

detecting at least one of a temperature of the adsorbent and a temperature at a location downstream of the adsorbent; and controlling the valve to close the branch based on at least the detected temperature;

wherein the step of controlling the valve includes:

comparing the detected temperature with a threshold value;

measuring a time since supply of the exhaust gas to the adsorbent has started; and controlling the valve to close the branch when the detected temperature is greater or equal to the threshold value or when the measured time is greater or equal to a predetermined value.

20. The computer program embodied on a computer-readable medium for purifying exhaust gas generated by an internal combustion engine having an adsorbent installed at a bypass exhaust gas passage branched from an exhaust pipe of the engine and merged into the exhaust pipe at a location downstream of the absorbent, the bypass exhaust gas passage being opened by a switch-over valve at starting of the engine to introduce the exhaust gas such that the adsorbent adsorbs unburned HC in exhaust gas generated by the engine and being closed such that the adsorbent desorbs the adsorbed HC and the desorbed HC is thereafter recirculated at a position upstream of a catalyst comprising the steps of:

detecting at least one of a temperature of the adsorbent and a temperature at a location downstream of the adsorbent;

measuring a time until the detected temperature becomes greater or equal to a predetermined value; and discriminating whether the adsorbent deteriorates based on at least the measured time;

wherein the discriminating step includes the steps of:

comparing the measured time with a threshold value; and discriminating whether the adsorbent deteriorates based on a result of comparison.

* * * * *